United States Patent
Kiehlneker et al.

(10) Patent No.: US 9,506,546 B2
(45) Date of Patent: Nov. 29, 2016

(54) NOZZLE ARRANGEMENT AND MOTOR VEHICLE DRIVE TRAIN

(71) Applicant: GETRAG Getriebe- und Zahnradfabrik Hermann Hagenmeyer GmbH & Cie KG, Untergruppenbach (DE)

(72) Inventors: Alexander Kiehlneker, Flein (DE); Elisabet Wagner, Bietigheim-Bissingen (DE); Christian Anzt, Grossbottwar (DE)

(73) Assignee: GETRAG Getriebe- und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 267 days.

(21) Appl. No.: 14/296,639

(22) Filed: Jun. 5, 2014

(65) Prior Publication Data

US 2014/0360175 A1    Dec. 11, 2014

(30) Foreign Application Priority Data

Jun. 7, 2013   (DE) .................... 20 2013 102 446 U

(51) Int. Cl.
*F16L 55/027* (2006.01)
*F16H 39/04* (2006.01)
*B05B 1/04* (2006.01)

(52) U.S. Cl.
CPC .............. *F16H 39/04* (2013.01); *B05B 1/046* (2013.01)

(58) Field of Classification Search
CPC .......................... Y10T 137/7939; F02M 59/44
USPC ...................... 138/40–42; 137/544; 251/118
See application file for complete search history.

(56) References Cited

U.S. PATENT DOCUMENTS

| | | | | |
|---|---|---|---|---|
| 2,501,593 A | * | 3/1950 | Becker | F16L 55/00 138/44 |
| 3,072,261 A | * | 1/1963 | Smith | F15B 21/041 138/42 |
| 3,921,672 A | * | 11/1975 | Arnold | F16K 51/00 138/42 |
| 5,937,909 A | * | 8/1999 | Clauss | F02M 59/466 138/43 |
| 6,668,863 B2 | | 12/2003 | Maier | |

FOREIGN PATENT DOCUMENTS

DE    10048365 A1    4/2002

OTHER PUBLICATIONS

German Search Report dated Feb. 11, 2014, 5 pages.

* cited by examiner

*Primary Examiner* — Patrick F Brinson
(74) *Attorney, Agent, or Firm* — Reising Ethington P.C.

(57) ABSTRACT

Nozzle arrangement for fluid applications, in particular for a hydraulic circuit of a motor vehicle drive train. A nozzle body has a first longitudinal end and a second longitudinal end. The nozzle body has a first longitudinal section having a cylindrical outer circumference, which has a first outside diameter. The nozzle body has a blind hole starting from the first longitudinal end. In the region of the second longitudinal end, the nozzle body has a second longitudinal section having a second outside diameter, which is smaller than the first outside diameter. A third longitudinal section is formed between the first longitudinal section and the second longitudinal section. A substantially radially aligned nozzle bore connects the outer circumference of the third longitudinal section to the blind hole. The outer circumference of the first longitudinal section is designed as a press-fitting surface, allowing the nozzle body to be pressed into a bore and allowing the second longitudinal section to form an annular gap with an inner circumference of the bore.

21 Claims, 2 Drawing Sheets

NOZZLE ARRANGEMENT AND MOTOR VEHICLE DRIVE TRAIN

CROSS REFERENCES TO RELATED APPLICATIONS

This application claims the priority of German utility model application DE 20 2013 102 446.5, filed Jun. 7, 2013.

BACKGROUND OF THE INVENTION

The present invention relates to a nozzle arrangement for fluid applications, in particular for a hydraulic circuit of a motor vehicle drive train, having a nozzle body, which has a first longitudinal end and a second longitudinal end, wherein the nozzle body has a first longitudinal section having a cylindrical outer circumference, which has a first outside diameter, wherein the nozzle body has a blind hole starting from the first longitudinal end, wherein, in the region of the second longitudinal end, the nozzle body has a second longitudinal section having a second outside diameter, which is smaller than the first outside diameter, wherein a third longitudinal section is formed between the first longitudinal section and the second longitudinal section, and wherein a substantially radially aligned nozzle bore connects the outer circumference of the third longitudinal section to the blind hole.

The present invention furthermore relates to a motor vehicle drive train having a housing, in which a fluid is received, and having a hydraulic circuit, which has a low-pressure section and a high-pressure section, which are connected to one another by a housing section, and having a nozzle arrangement.

Nozzle arrangements of the type stated at the outset are also referred to as gap filter nozzles. Here, the nozzle bore substantially defines the hydraulic properties, where relevant together with the design of the blind hole (the inside diameter and length thereof). Nozzle arrangements of this kind are used in hydraulic circuits of motor vehicle drive trains, for example, as orifices, via which a specific leakage from a high-pressure section to a low-pressure section can take place In this case, the annular gap that can be established by means of the nozzle arrangement is preferably designed in such a way that, overall, it has a larger cross-sectional area than the nozzle bore but the gap width is less than the diameter of the nozzle bore. Consequently, the annular gap can serve as a filter for particles which might clog the nozzle bore. Thus, the annular gap serves as a kind of anti-clogging device for the nozzle bore.

Known nozzle arrangements of this kind have an external thread in the region of a longitudinal section to enable the nozzle body to be screwed into an internally threaded hole. Here, it is necessary to secure the nozzle body by means of a retention means against coming unscrewed. Known nozzle arrangements are furthermore generally of two-part construction to enable the radially aligned nozzle bore, in particular, to be produced.

Other known filter nozzles have a pot-shaped nozzle body, at the pot bottom of which there is a nozzle bore, and have a rigidly mounted screen as a "pot lid".

In the prior art, the nozzle arrangement generally consists of at least two parts, requiring pre-assembly, which leads to high costs. Moreover, the nozzle body generally has an external thread, making it necessary to secure the nozzle body against release in the assembled state, leading to high assembly costs. In addition, there is a need in the housing for an internally threaded bore, which is likewise expensive to produce. Furthermore, the cutting of the thread can give rise to swarf, which can block the nozzle bore, resulting in problems in respect of service life and/or reliability.

Moreover, some filter elements of hydraulic components have moving parts, and this can likewise lead to high costs and reliability problems.

SUMMARY OF THE INVENTION

Given this background, it is an object of the invention to specify an improved nozzle arrangement and an improved motor vehicle drive train.

The above object is achieved in the case of the nozzle arrangement mentioned at the outset by virtue of the fact that the outer circumference of the first longitudinal section is designed as a press-fitting surface, allowing the nozzle body to be pressed into a bore and allowing the second longitudinal section to form an annular gap with an inner circumference of the bore.

The above object is furthermore achieved by a motor vehicle drive train of the type stated at the outset, wherein the hydraulic circuit has a nozzle arrangement according to the invention, which is inserted, in particular press-fitted, into a bore in the housing section.

Here, the nozzle arrangement preferably consists only of a single component, namely the nozzle body. In this arrangement, the function of the annular gap is achieved only after mounting in the bore. Moreover, mounting is simple to achieve since the nozzle body can be pressed into the bore and hence no additional axial retention means are required. It is furthermore preferably not necessary to cut a thread on the nozzle body and/or on the housing, and therefore increased reliability is also obtained.

Overall, it is possible in this way to reduce the assembly effort and the costs for the nozzle arrangement.

The machining of the bore into which the nozzle body is to be pressed is relatively simple. For example, the bore can be reamed or ball-calibrated to the fit size, these being non-cutting processes, and therefore the risk of swarf formation is significantly reduced.

The nozzle body is preferably pressed into the bore with the second longitudinal section to the fore. The bore can be a bore in a tube, but the bore is preferably a housing bore in a housing section of a housing, in particular a housing section of a housing of a motor vehicle drive train.

The hydraulic circuit can, for example, have a pump which is driven by means of an electric motor and which has a suction port connected to a low-pressure section and has a pressure port, wherein the pressure port is connected directly to an actuating cylinder for a subassembly of the drive train, e.g. a clutch, in particular a wet multi-disc clutch. In hydraulic circuits of this kind, actuation of the subassembly is accomplished by controlling the speed of the pump. Controllability can be improved here if the pressure port is connected to a low-pressure section via an orifice. In this case, the orifice is preferably implemented by a nozzle arrangement of the type according to the invention, wherein the hydraulic resistance of the orifice is defined precisely by means of the diameter of the nozzle bore. In this context, the radial length of the nozzle bore can also vary the behavior from "nozzle-like" to "ideal orifice".

The radial dimension of the annular gap is preferably smaller than the diameter of the nozzle bore and, in particular, is less than half of the diameter of the nozzle bore, thereby making it possible to achieve good filtration with respect to particles. Owing to the annular structure of the annular gap, clogging does not occur immediately, even when several particles settle, as could be the case with a small nozzle bore.

The object is thus fully achieved.

According to a preferred embodiment, the first longitudinal section is formed adjacent to the first longitudinal end.

It is furthermore advantageous if the third longitudinal section has a third outside diameter, which is smaller than the second outside diameter.

Here, an annular duct is established in the region of the third longitudinal section. In this case, the radial depth of the annular duct can determine the radial length of the nozzle bore.

According to another preferred embodiment, the nozzle body is of rotationally symmetrical design with respect to a longitudinal axis.

In this case, the nozzle body can be produced in a simple manner by turning. It is self-evident that the nozzle bore represents a deviation from rotational symmetry and can be introduced before or after the turning operation, for example.

According to another preferred embodiment, the nozzle body has an insertion chamfer in the region of a transition between the third longitudinal section and the first longitudinal section.

This makes it easier to introduce the nozzle body into a bore for the purpose of press-fitting. It is thereby furthermore possible to ensure centering during press-fitting. The chamfer preferably has a conical shape. The chamfer angle relative to the longitudinal axis is preferably in a range of from 2° to 30°, in particular in a range of from 1020 to 20°.

It is furthermore preferred overall if the nozzle body has an internally threaded section in the region of the blind hole.

By means of an internally threaded section of this kind, the nozzle body can be pulled out of the bore again for the purpose of replacement or cleaning or the like.

In any case, disassembly is simplified. Since the nozzle body is cleaned before assembly, the swarf produced by the production of the threaded section can be removed in advance.

In one variant, the nozzle body is produced from steel. This allows simple production. Moreover, the press-fit joint can be implemented in such a way that high axial removal forces can be achieved.

In an alternative embodiment, the nozzle body is produced from aluminum. The term "aluminum" preferably includes aluminum and also suitable aluminum alloys.

In this case, the nozzle body can be provided at a lower weight.

In this case, it is preferred if the nozzle body has a coating of greater hardness than that of aluminum, at least in the region of the press-fitting surface.

The coating can be formed by hard anodic coating or hard anodization, for example.

According to another aspect of the present invention, a nozzle arrangement according to the preamble of claim 1 is provided, wherein the first longitudinal section has an external thread or is designed as an unmachined cylindrical section.

In the first case, the nozzle body can be screwed into an internally threaded bore in a housing. In the second case, the nozzle body can be inserted into a bore and secured there axially in some other way.

In contrast to the embodiment mentioned at the outset, in which the nozzle body is fixed axially in a bore by means of a press-fit joint, this may result in an increased assembly effort. However, the possibility of disassembly may be rendered easier.

In both aspects according to the invention, it is preferred that the annular gap should be formed by the one-piece nozzle body and an inner wall of a bore in which the nozzle body is to be mounted.

It is self-evident that the features mentioned above and those which remain to be explained below can be used not only in the respectively indicated combination but also in other combinations or in isolation without exceeding the scope of the present invention.

BRIEF DESCRIPTION OF THE DRAWINGS

Exemplary embodiments of the invention are represented in the drawings and are explained in more detail in the following description. In the drawings.

DESCRIPTION OF PREFERRED EMBODIMENTS

Figure 1:
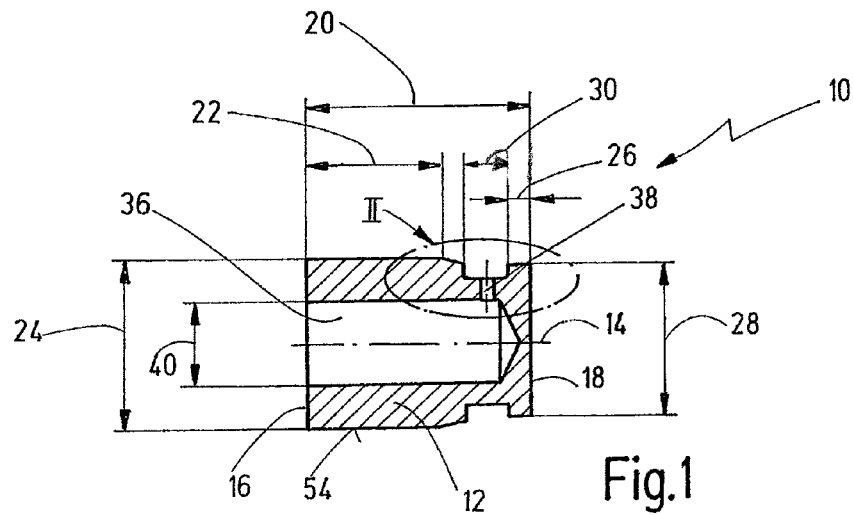
FIG. 1 shows a longitudinally sectioned view through one embodiment of a nozzle arrangement.
Figure 2:
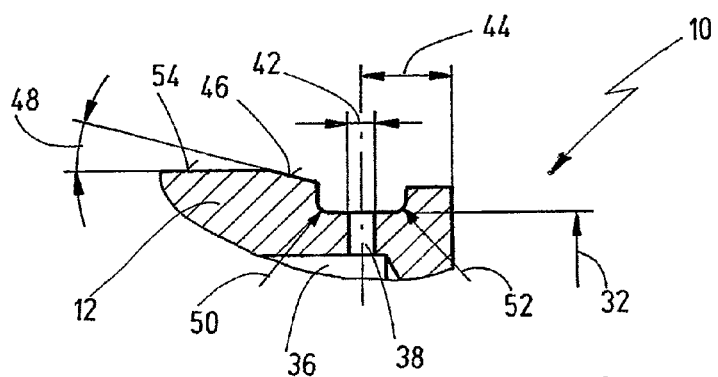
FIG. 2 shows a detail II of FIG. 1.

A nozzle arrangement 10 is shown in longitudinal section in FIGS. 1 and 2. The nozzle arrangement 10 has a nozzle body 12, which is of rotationally symmetrical design in relation to a longitudinal axis. The nozzle body 12 has a first longitudinal end 16 and a second longitudinal end 18, with a length 20 which can be in a range of from 5 mm to 10 mm, for example.

Adjacent to the first longitudinal end 16, the nozzle body 12 has a first longitudinal section 22 having a first outside diameter 24. The outside diameter 24 can be in a range of from 5to 15 mm, for example. Adjacent to the second longitudinal end 18, the nozzle body 12 has a second longitudinal section 26 having a second outside diameter 28. The second outside diameter 28 is less than the first outside diameter 24 and can be in a range of from 4 mm to 14 mm, for example.

Formed between the first longitudinal section 22 and the second longitudinal section 26 is a third longitudinal section 30, which has a third outside diameter 32. The third outside diameter 32 is less than the second outside diameter and can be in a range of from 3 mm to 10 mm, for example.

Also formed on the nozzle body 12 is a blind hole 36, which extends from the first longitudinal end 16 into the region of the third longitudinal section 30. In the region of the third longitudinal section 30, a radially extending nozzle bore 38 is provided, which connects the outer circumference of the third longitudinal section 30 to the blind hole 36.

The blind hole 36 has a blind hole diameter 40, which can be in a range of from 2 mm to 8 mm, for example. The blind hole diameter 40 together with the third outside diameter 32 determines the radial length of the nozzle bore 38.

The nozzle bore 38 has a nozzle bore diameter 42, which can preferably be in a range of from 0.1 mm to 2 mm.

The nozzle bore 38 is spaced apart from the second longitudinal end 18 by an axial spacing 44, which can be in a range of from 0.5 mm to 5 mm.

In the region of a transition between the third longitudinal section 30 and the first longitudinal section 22, an insertion chamfer 46 is provided, being aligned at a chamfer angle 48 in a range of from 10° to 20°.

Also shown in FIG. 2 is a transition radius from the outside diameter of the third longitudinal section 30 toward a wall extending radially toward the insertion chamfer. A corresponding transition radius 52 from the third longitudinal section 30 toward the second longitudinal section 26 is shown at 52. The transition radii can be in a range of from 0.05 mm to 1 mm, for example.

The outer circumference of the first longitudinal section 22 is of cylindrical design and, in the present case, is designed as a press-fitting surface 54.

Figure 3:
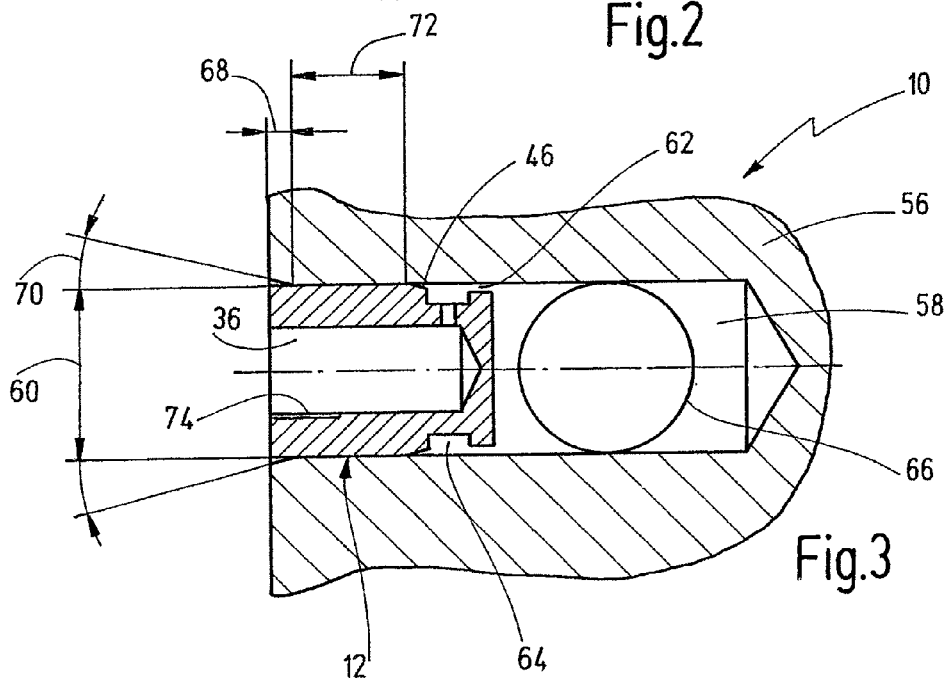
FIG. 3 shows a longitudinally sectioned view through a nozzle arrangement, wherein a nozzle body in FIGS. 1 and 2 is pressed into a bore.

FIG. 3 shows the nozzle body 12 inserted into a housing bore 58 in a housing 56. The housing bore 58 has a housing bore diameter 60, which is matched to the first outside diameter 24 in such a way that a press fit can be established between the nozzle body 12 and an inner circumference of the housing bore 58.

In the inserted state, in which the first longitudinal end 16 is preferably aligned with a wall of the housing 56, from which bore 58 extends, the outer circumference of the second longitudinal section 26 together with an inner circumference of the housing bore 58 forms an annular gap 62, the radial depth of which results from the difference between the first outside diameter 24 and the second outside diameter 28. The radial depth of the annular gap 62 is preferably less than half the nozzle bore diameter 42.

An annular duct 64, from which the nozzle bore 38 extends in a radial direction toward the blind hole 36, is furthermore established in the region of the third longitudinal section 30 by the smaller third outside diameter 32.

A transverse bore 66, via which fluid is fed into the housing bore 58, can furthermore be provided on the housing 56.

A housing chamfer 68, which is formed at a chamfer angle 70 that can be in the same range as the chamfer angle 48 of the insertion chamfer 46, is furthermore preferably formed on the housing 56 in the region of a mouth of the housing bore 58.

Owing to the insertion chamfer 46 and the housing chamfer 68, the resulting axial overlap 72 for the press fit is less than the axial length of the first longitudinal section 22.

An internal thread of the kind indicated schematically at 74 in FIG. 3 can furthermore be formed on the inner circumference of the blind hole 36.

By means of an internal thread of this kind, it is relatively simple to pull the nozzle body 12 back out of the housing bore 58.

Figure 4:
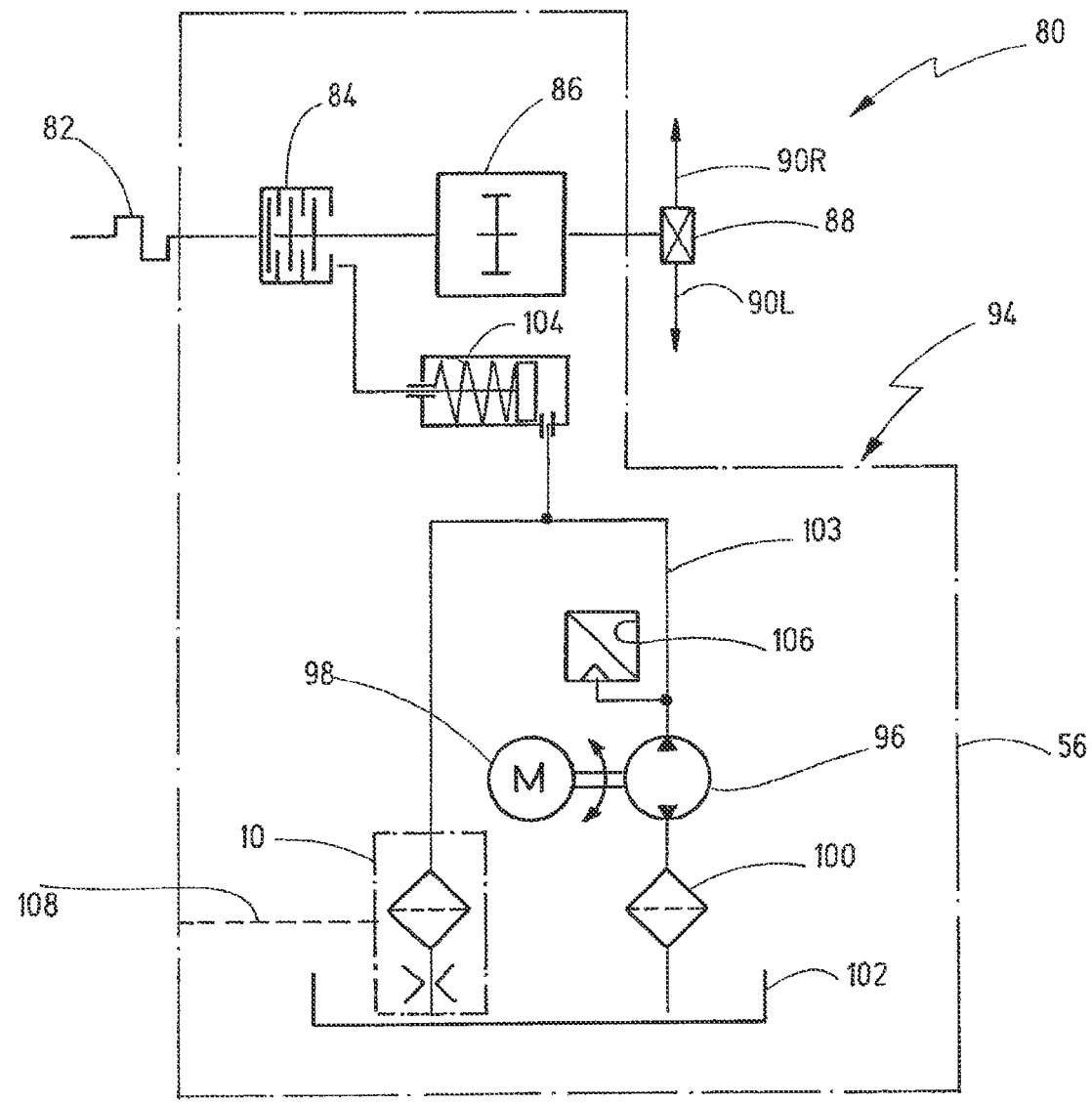
FIG. 4 shows a schematic illustration of a motor vehicle drive train having a hydraulic circuit that has a nozzle arrangement according to the invention.

FIG. 4 shows in schematic form a drive train 80 for a motor vehicle. The drive train 80 comprises a drive motor 82, such as an internal combustion engine, a clutch arrangement 84, which comprises a wet multi-disc clutch for example, and a transmission arrangement 86, which can be designed as a multi-stage spur gear transmission for example. An output of the transmission arrangement 86 is connected to a differential 88, by means of which motive power is distributed between driven wheels 90L, 90R.

The drive train 80 furthermore comprises a hydraulic circuit 94. The hydraulic circuit 94 has a pump 96 which can be driven bidirectionally. A pump shaft of the pump 96 is connected to an electric motor 98, which drives the pump 96. A suction port of the pump 96 is connected via a filter 100 to a fluid sump 102, which is formed in the interior of a housing 56 of the drive train 80. A pressure port of the pump 96 is connected by a fluid line 103 to a hydraulic cylinder 104, the piston of which serves in the present case to actuate the clutch arrangement 84, for example. In this arrangement, the pressure port of the pump 96 is connected directly, i.e. without proportional valves or the like in between, to a port of the hydraulic cylinder 104. Consequently, the pressure in the fluid line 103, which is measured by means of a pressure sensor 106 for example, can be controlled by adjusting the speed of the electric motor 98. Consequently, the actuating pressure and the actuating force for actuating the clutch arrangement 84 can be controlled by controlling the speed of the electric motor 98.

To improve controllability, the fluid line 103, which, in the present case, forms a high-pressure section, is connected via a nozzle arrangement 10 to the fluid sump 102, which forms a low-pressure section. The nozzle arrangement 10 comprises a filter and an orifice and is preferably integrated into a housing section 108 of the housing 56. The nozzle arrangement 10 is preferably implemented by means of a nozzle arrangement of the type described in FIGS. 1 to 3.

The invention claimed is:

1. Motor vehicle drive train having a housing, in which a fluid is received, and having a hydraulic circuit, which has a low-pressure section and a high-pressure section, which are connected to one another by a housing section, and having a nozzle arrangement which is inserted into a bore in the housing section, the nozzle arrangement comprising a nozzle body, which has a first longitudinal end and a second longitudinal end, wherein the nozzle body has a first longitudinal section having a cylindrical outer circumference, which has a first outside diameter, wherein the nozzle body has a blind hole starting from the first longitudinal end, wherein, in the region of the second longitudinal end, the nozzle body has a second longitudinal section having a second outside diameter, which is smaller than the first outside diameter, wherein a third longitudinal section is formed between the first longitudinal section and the second longitudinal section, and wherein a substantially radially aligned nozzle bore connects the outer circumference of the third longitudinal section to the blind hole, and wherein the outer circumference of the first longitudinal section is designed as a press-fitting surface, allowing the nozzle body to be pressed into the bore and allowing the second longitudinal section to form an annular gap with an inner circumference of the bore.

2. Motor vehicle drive train according to claim 1, wherein the first longitudinal section is formed adjacent to the first longitudinal end.

3. Motor vehicle drive train according to claim 1, wherein the third longitudinal section has a third outside diameter, which is smaller than the second outside diameter.

4. Motor vehicle drive train according to claim 1, wherein the nozzle body is of rotationally symmetrical design with respect to a longitudinal axis.

5. Motor vehicle drive train according to claim 1, wherein the nozzle body has an insertion chamfer in the region of a transition between the third longitudinal section and the first longitudinal section.

6. Motor vehicle drive train according to one of claim 1, wherein the nozzle body has an internally threaded section in the region of the blind hole.

7. Motor vehicle drive train according to claim 1, wherein the nozzle body is produced from steel.

8. Motor vehicle drive train according to claim 1, wherein the nozzle body is produced from aluminum.

9. Motor vehicle drive train according to claim 8, wherein the nozzle body has a coating of greater hardness than that of aluminum, at least in the region of the press-fitting surface.

10. Motor vehicle drive train according to claim 1, wherein the first longitudinal section is designed as an unmachined cylindrical section.

11. Motor vehicle drive train according to claim 1, wherein the high-pressure section is connected to the low-pressure section via an orifice, the orifice being formed by the nozzle arrangement, and wherein a hydraulic resistance of the orifice is defined by a diameter of the bore.

12. Nozzle arrangement for fluid applications, comprising a nozzle body, which has a first longitudinal end and a second longitudinal end, wherein the nozzle body has a first longitudinal section having a cylindrical outer circumference, which has a first outside diameter, wherein the nozzle body has a blind hole starting from the first longitudinal end, wherein, in the region of the second longitudinal end, the nozzle body has a second longitudinal section having a second outside diameter, which is smaller than the first outside diameter, wherein a third longitudinal section is formed between the first longitudinal section and the second longitudinal section, and wherein a substantially radially aligned nozzle bore connects the outer circumference of the third longitudinal section to the blind hole, and wherein the outer circumference of the first longitudinal section is designed as a press-fitting surface, allowing the nozzle body to be pressed into a bore and allowing the second longitudinal section to form an annular gap with an inner circumference of the bore, wherein the nozzle body has an internally threaded section in the region of the blind hole.

13. Nozzle arrangement according to claim 12, wherein the first longitudinal section is formed adjacent to the first longitudinal end.

14. Nozzle arrangement according to claim 12, wherein the third longitudinal section has a third outside diameter, which is smaller than the second outside diameter.

15. Nozzle arrangement according to claim 12, wherein the nozzle body is of rotationally symmetrical design with respect to a longitudinal axis.

16. Nozzle arrangement according to claim 12, wherein the nozzle body has an insertion chamfer in the region of a transition between the third longitudinal section and the first longitudinal section.

17. Nozzle arrangement according to claim 12, wherein the nozzle body is produced from steel.

18. Nozzle arrangement according to claim 12, wherein the nozzle body is produced from aluminum.

19. Nozzle arrangement according to claim 18, wherein the nozzle body has a coating of greater hardness than that of aluminum, at least in the region of the press-fitting surface.

20. Nozzle arrangement according to claim 12, wherein the first longitudinal section is designed as an unmachined cylindrical section.

21. Nozzle arrangement for fluid applications, comprising a nozzle body, which has a first longitudinal end and a second longitudinal end, wherein the nozzle body has a first longitudinal section having a cylindrical outer circumference, which has a first outside diameter, wherein the nozzle body has a blind hole starting from the first longitudinal end, wherein, in the region of the second longitudinal end, the nozzle body has a second longitudinal section having a second outside diameter, which is smaller than the first outside diameter, wherein a third longitudinal section is formed between the first longitudinal section and the second longitudinal section, and wherein a substantially radially aligned nozzle bore connects the outer circumference of the third longitudinal section to the blind hole, and wherein the outer circumference of the first longitudinal section is designed as a press-fitting surface, allowing the nozzle body to be pressed into a bore and allowing the second longitudinal section to form an annular gap with an inner circumference of the bore, wherein the nozzle body is produced from aluminum, and wherein the nozzle body has a coating of greater hardness than that of aluminum, at least in the region of the press-fitting surface.

* * * * *